United States Patent
Allard et al.

(10) Patent No.: US 9,891,344 B2
(45) Date of Patent: Feb. 13, 2018

(54) COMPUTER ESTIMATION METHOD, AND METHOD FOR OIL EXPLORATION AND DEVELOPMENT USING SUCH A METHOD

(75) Inventors: Denis Allard, Avignon (FR); Alexandre Walgenwitz, Besancon (FR); Pierre Biver, Pau (FR)

(73) Assignee: TOTAL SA, Courbevoie (FR)

( * ) Notice: Subject to any disclaimer, the term of this patent is extended or adjusted under 35 U.S.C. 154(b) by 996 days.

(21) Appl. No.: 14/004,052

(22) PCT Filed: Mar. 8, 2012

(86) PCT No.: PCT/FR2012/050492
§ 371 (c)(1),
(2), (4) Date: Jan. 31, 2014

(87) PCT Pub. No.: WO2012/120241
PCT Pub. Date: Sep. 13, 2012

(65) Prior Publication Data
US 2014/0149044 A1 May 29, 2014

(30) Foreign Application Priority Data

Mar. 9, 2011 (FR) ...................................... 11 51911

(51) Int. Cl.
*G01V 11/00* (2006.01)
*G01V 99/00* (2009.01)

(52) U.S. Cl.
CPC ............ *G01V 11/002* (2013.01); *G01V 11/00* (2013.01); *G01V 99/00* (2013.01); *G01V 2210/665* (2013.01)

(58) Field of Classification Search
None
See application file for complete search history.

(56) References Cited

U.S. PATENT DOCUMENTS

| 5,539,704 A | 7/1996 | Doyen et al. |
| 5,995,906 A | 11/1999 | Doyen et al. |
| 7,254,091 B1 | 8/2007 | Gunning et al. |
| 2010/0082724 A1 | 4/2010 | Diyankov et al. |

(Continued)

FOREIGN PATENT DOCUMENTS

| WO | WO 2009/138290 | 11/2009 |
| WO | WO 2010/031128 A1 | 3/2010 |

OTHER PUBLICATIONS

Gabriel et al., Estimating and testing zones of abrupt change for spatial data, Sep. 23, 2009, Stat Comput, 21:107-120.*

(Continued)

*Primary Examiner* — An Do
*Assistant Examiner* — Renee I Wilson
(74) *Attorney, Agent, or Firm* — Patterson Thuente Pedersen, P.A.

(57) ABSTRACT

The invention relates to a method for estimating a set of variables associated with sites of an area, the method comprising the following steps: a) a set of observation data is supplied, b) a variable associated with a site of a first sub-area is estimated by krigeing, using the precision matrix of the first sub-area, c) a second adjacent sub-area is determined, d) a variable associated with a site of the second sub-area is estimated by krigeing, on the basis of the first sub-space, the second sub-space, and the precision matrix determined for the first sub-space.

18 Claims, 4 Drawing Sheets (56) References Cited

U.S. PATENT DOCUMENTS

2010/0121623 A1* 5/2010 Yogeswaren .......... G01V 11/00
  703/2
2010/0174514 A1 7/2010 Melkumyan et al.

OTHER PUBLICATIONS

Patent Act 1977 Examination Report Under Section 18(3) for Application No. GB1315670.8, dated Apr. 22, 2016 (1 page).
International Preliminary Examination Report for Application No. PCT/FR2012/050492, dated Sep. 10, 2013 (6 pages).

* cited by examiner

000
COMPUTER ESTIMATION METHOD, AND METHOD FOR OIL EXPLORATION AND DEVELOPMENT USING SUCH A METHOD

PRIORITY CLAIM

The present application is a National Phase entry of PCT Application No. PCT/FR2012/050492, filed Mar. 8, 2012, which claims priority from FR Application No. 11 51911 filed Mar. 9, 2011, said applications being hereby incorporated by reference herein in their entirety.

TECHNICAL FIELD

The present invention relates to computer methods of estimation, methods of oil exploration and exploitation implementing such methods.

BACKGROUND OF THE INVENTION

More particularly, the invention pertains to a computer method for estimating a suite of quantities associated with locations of a space, for example a method for modeling petrophysical quantities of a reservoir or a method for mapping the depth or thickness of a geological layer.

In the area of oil exploration, it is sought to obtain information about subsurfaces, so as to be able to predict the presence of hydrocarbons to be extracted. Regular recourse is had to observation methods for estimating the quantities associated with certain locations of the space. To reduce to the maximum the recourse to these observation methods, which are expensive to implement, the computing tool is used to estimate the quantities at locations where no measurement has been performed.

In particular, use is made of interpolation methods such as kriging. Kriging is an unbiased interpolator which minimizes the mean square prediction error and which makes it possible to honor the available data (it is an exact interpolator).

An example of such a method is for example described in U.S. Pat. No. 7,254,091.

A difficulty related to kriging is that it requires large computational power to invert the covariance matrix. This is true in particular when working on a large space, using numerous observation data.

To alleviate this problem, in the case of large suites of observation data, it is possible as a variant to work on sub-spaces. For each point studied for which it is sought to estimate the quantity, local reasoning is employed by searching for the observation data obtained for the points nearest to the point studied, and by using a local covariance matrix reduced to these points. The computation time necessary for the inversion of a large matrix is then reduced by implementing a nearest neighbors search and the inversion of a smaller matrix. This search and this inversion must however be repeated for each point to be estimated. To reduce to the maximum the computation times, there is then a tendency to limit as much as possible the number of observations to be taken into account (i.e. the number of neighbors), so as to limit as much as possible the size of the matrices to be inverted.

This method is problematic however. On the one hand, it is very sensitive to the spatial distribution of the observation data, this sensitivity is manifested by neighborhood artifacts. Moreover, it may still be greedy in terms of computation time in the search for the neighborhoods.

SUMMARY OF THE INVENTION

The aim of the present invention is in particular to alleviate these drawbacks.

For this purpose, according to the invention, there is envisaged a computerized method for estimating a suite of quantities associated with locations of a space, the method comprising the following steps:

a) a set of observation data comprising quantities associated with certain locations is provided, b) a quantity associated with at least one location of a first sub-space included in said space is estimated by kriging, using the precision matrix of the first sub-space, c) a second sub-space included in said space and neighboring the first sub-space is determined, d) a quantity associated with at least one location of the second sub-space is estimated by kriging on the basis of the first sub-space, of the second sub-space, and of the precision matrix determined for the first sub-space.

The precision matrix is the inverse of the covariance matrix.

By virtue of these provisions, precise quantities making it possible to characterize the space are obtained rapidly. This method finds particularly beneficial applications in oil exploration, where the observation data may be provided for very disparate locations. However, other areas of application of kriging could benefit from the present invention.

In preferred embodiments of the invention, recourse may optionally be had furthermore to one and/or to the other of the following provisions:

in step d), the precision matrix of the second sub-space is determined, on the basis of the precision matrix of the first sub-space, and of the Schur complement of the covariance matrix of one of the first and second sub-spaces;

the second sub-space is obtained by adding locations to the first sub-space, and in step d), we solve:

$$C_{A \cup B, A \cup B}^{-1} = \begin{pmatrix} C_{A,A}^{-1} + UR^t & -R \\ -R^t & T \end{pmatrix},$$

Where
A denotes the set of locations of the first sub-space,
B denotes the set of added locations,
U denotes the set union operation,
$C_{X,Y}$ denotes the covariance matrix of the sets X and Y,
$-1$ denotes the matrix inversion operation,
t denotes the matrix transposition operation,
$U = C_{A,A}^{-1} C_{A,B}$,
$S = C_{B,B} - C_{A,B}^t U$, is the Schur complement of $C_{A \cup B, A \cup B}$,
$T = S^{-1}$,
$R = UT$;

the second sub-space is obtained by removing locations from the first sub-space, and in which, in step d), we solve:

$$C_{A \cup B, A \cup B}^{-1} = \begin{pmatrix} C_{A,A}^{-1} + UR^t & -R \\ -R^t & T \end{pmatrix},$$

Where
A denotes the set of locations of the second sub-space,
B denotes the set of removed locations,
U denotes the set union operation, $C_{X,Y}$ denotes the covariance matrix of the sets X and Y,
−1 denotes the matrix inversion operation,
t denotes the matrix transposition operation,
$U = C^{-1}_{A,A} C_{A,B}$,
$S = C_{B,B} - C^t_{A,B} U$, is the Schur complement of $C_{A \cup B, A \cup B}$,
$T = S^{-1}$,
$R = UT$;

the second sub-space is obtained at one and the same time by adding locations to and removing locations from the first sub-space;

the sub-spaces comprise at least 16 locations, for example at least 200 locations;

in step b), a suite of quantities associated with a plurality of locations of the first sub-space is estimated by kriging when the first sub-space is sufficiently near to said plurality of locations;

in step c), the second sub-space is determined on the basis of the first sub-space;

in step c) one and/or the other of the following operations are/is implemented:

addition of locations to the first sub-space, said added locations being near to said location for which step d) is implemented, removal of locations from the first sub-space, said removed locations being far from said location for which step d) is implemented;

after step a), and before step c), step z) is implemented in the course of which a tree is constructed of the locations for which quantities obtained in step a) are available;

in step c), the second sub-space is determined on the basis of said tree;

in step z), the tree comprises a plurality of levels each defining a partition of the set of locations determined in step a), each node of a level comprising a group of locations, said group being partitioned into at least one node of the directly lower level branched to this node, disregarding the groups associated with terminal nodes;

in step b), the first subset is constructed by sweeping the tree in search of the locations nearest to the location for which it is desired to estimate the quantity;

in step c), the second subset is constructed by using the first subset and the distance between the locations for which it is desired to determine the quantities in step b) and in step d);

in step c), to impose a distribution of the nearest neighbors, the search for the nearest neighbors is constrained in accordance with several sectors and then the searches are merged;

the rows and the columns of the precision matrix are ordered according to the distance of the locations of the second sub-space from the location considered on the basis of said tree;

the space is a subsurface, the quantities are geological quantities of said subsurface, and the method is implemented by using in step a) quantities obtained by well measurement or seismic acquisition;

such a method is implemented and a step y) is implemented in the course of which an oil exploitation rig is constructed for said space.

According to another aspect, the invention pertains to the hydrocarbon produced by such a method.

According to another aspect, the invention pertains to the computer program product suitable for implementing the steps of such methods when it is implemented on a programmable machine.

BRIEF DESCRIPTION OF THE DRAWINGS

Other characteristics and advantages of the invention will be apparent in the course of the following description of one of its embodiments, given by way of nonlimiting example, with regard to the attached drawings.

In the drawings.

In the various figures, the same references denote identical or similar elements.

DETAILED DESCRIPTION OF THE DRAWINGS

Figure 1:
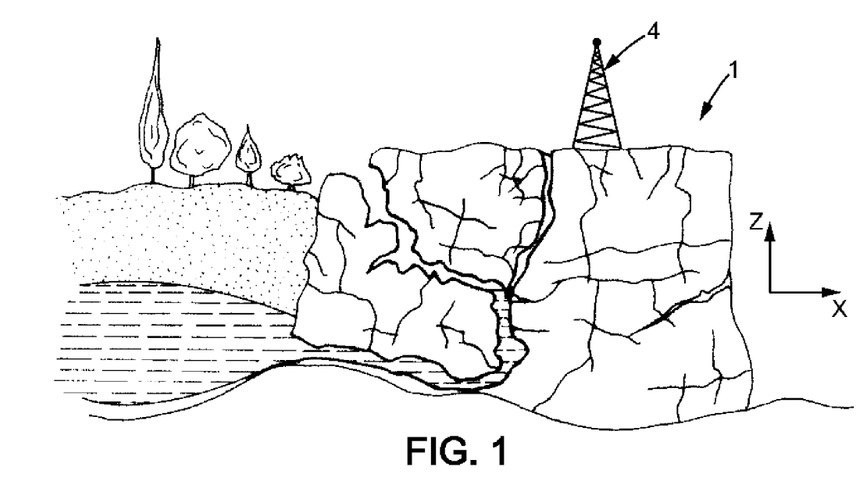
FIG. 1 is a cross-sectional schematic view of a space.

FIG. 1 schematically represents a section of a space 1 whose oil-bearing character it is desired to estimate. The space studied may for example be two-dimensional, such as the plane represented, or three-dimensional, comprising a large number of such sections distributed along the direction normal to the cross-sectional plane of FIG. 1. Z is the vertical direction, and X the horizontal direction included in the p14229ane. The space studied is for example a subsurface for which it is envisaged that oil exploitation be undertaken. For this purpose, it is possible to seek to determine a certain number of quantities characteristic of the subsurface. The quantities that it is sought to estimate are quantities typical of a hydrocarbon reservoir such as the thicknesses of geological layers disposed in the subsurface, the presence and the amount of fluids, hydrocarbons, the net-to-gross (NG), the fluid velocities, the porosity, the net sand, etc. and combinations of these quantities, in particular, any quantity making it possible to model a hydrocarbon reservoir in the space considered.

According to one mode of implementation of the invention, it is sought to estimate these quantities for a large number of locations of the space. Thus, recourse may be had to a computerized method of estimation implemented on a computerized system such as that represented in FIG. 7.

Figure 2:
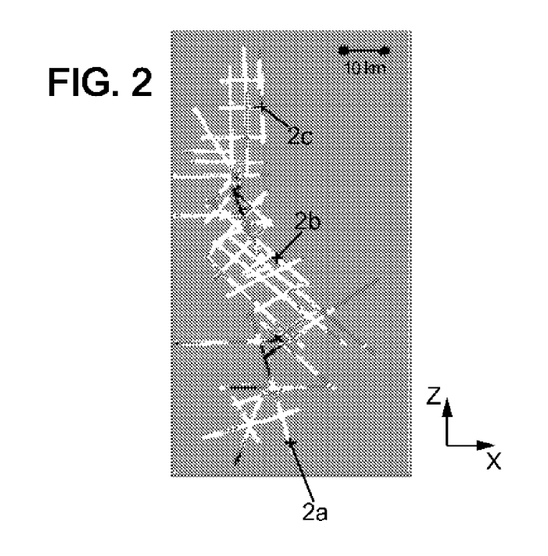
FIG. 2 is a schematic view from above of data of observations obtained in the space.

A set of observation data is available, as represented in FIG. 2, for the space. FIG. 2 represents, at a certain number of locations 2a, 2b, 2c the value of the measured quantity for this location. In FIG. 2, the locations represented in light gray, such as the location 2a, show that the quantity measured here is higher than a certain higher threshold. In the locations, such as the location 2c, represented in dark gray, the measured value of the quantity is lower than a certain lower threshold. In the locations, such as the location 2b, symbolized in white in FIG. 2, the value measured for the quantity lies between the above-mentioned two thresholds. Measurements of value of the quantity are thus obtained at a restricted number of locations of the space, the value of the quantity in the other locations being unknown.

For example, the observation data 2a, 2b, 2c are obtained by seismic imaging of the subsurface. Thus, the locations for which the quantity is measured may exhibit very disparate spacings. For example, in FIG. 2, they may be spaced apart by the order of several meters to several kilometers.

Figure 6:
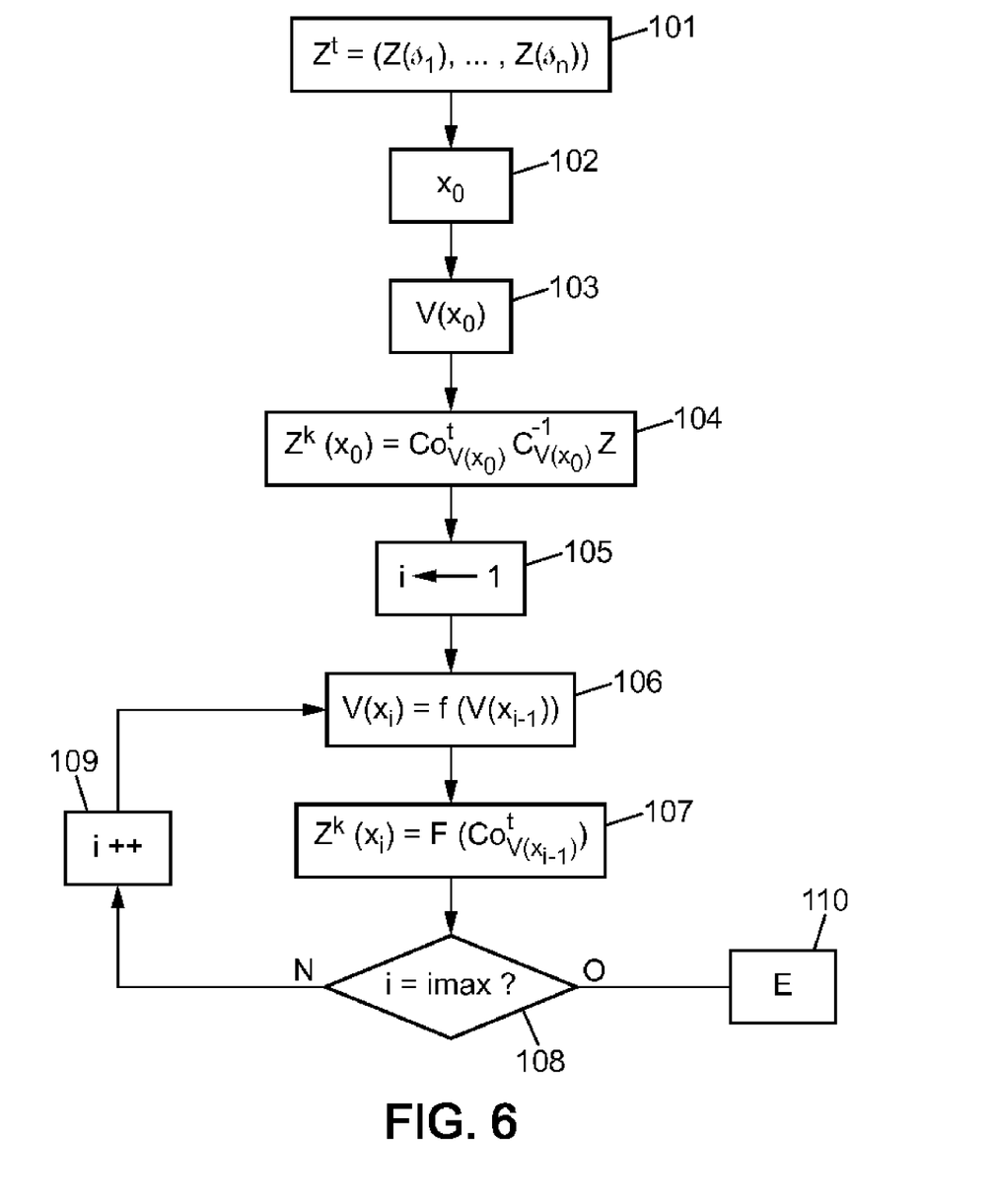
FIG. 6 is a descriptive flowchart of an exemplary embodiment of the method.

As is represented in FIG. 6, in step 101, a given vector of observations $Z^t = (Z(S_1) \ldots ; Z(S_n))$ is provided, where $S_1$, $S_i$, $S_n$ represent the locations at which observation data have been obtained, and $Z(S_i)$ represents the observation datum at the point $S_i$.

Figure 3:
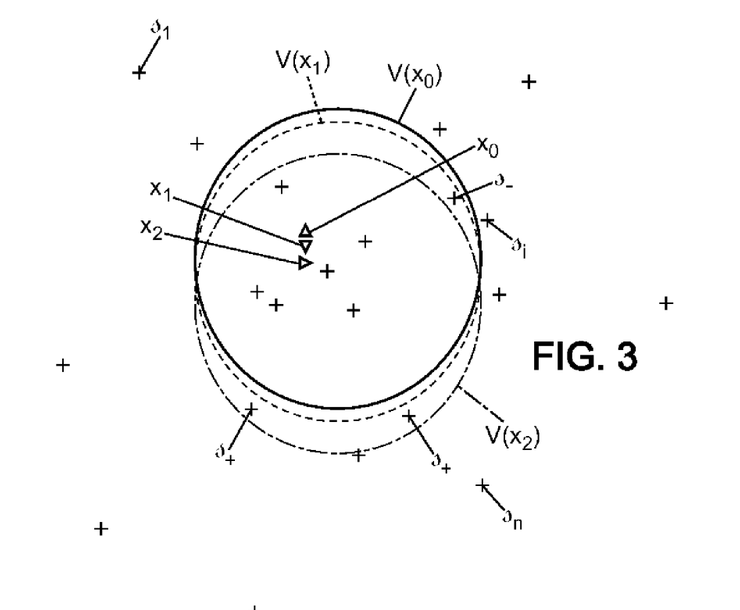
FIG. 3 is a schematic view of a method for searching for neighboring sub-spaces.

In step 102, a location $x_0$ for which it is desired to estimate the quantity $Z(x_0)$ is determined The point $x_0$ is represented by an upward pointing triangle in FIG. 3. The locations $S_i$ are represented by crosses in this figure.

In step 103, a neighborhood $V(x_0)$ of the location $x_0$ is determined This neighborhood consists for example of a set of $n_0$ locations $S_i$ for which a measurement of the quantity is available, and situated preferably a distance of less than a predetermined threshold from the location $x_0$. The distance in question can be any distance suitable for the situation, such as the Manhattan and Euclidian distance, or some other distance. The number $n_0$ can be for example sixteen locations Si, two hundred locations Si, or some other number.

In step 104, the value of the quantity $Z^k(x_0)$ at the point $x_0$ is then estimated by kriging.

The term kriging denotes an unbiased linear spatial forecaster obtained by minimizing the prediction variance, it being assumed that the covariance function of the quantity Z is known.

In matrix notation, the equations of simple kriging (assuming without loss of generality that m=0) at a site $x_0$ may be written:

$$C \Lambda = C_0,$$

where C is the n×n covariance matrix whose elements are $C(s_\alpha - s_\beta)$ and where C(h) is the covariance function of the quantity Z, $\Lambda$ is the vector of the n weightings $\lambda_\alpha$, and $C_0$ is the vector of elements $C(s_0 - s_\alpha)$.

The matrix C is symmetric, definite, positive and invertible. The inversion of the matrix C gives the kriging weightings:

$$\Lambda = C^{-1} C_0.$$

The simple kriging of $Z(x_0)$ and the associated kriging variance are $$Z^{KS}(x_0) = \Lambda^t Z = C_0^t C^{-1} Z,$$

$$\text{and } \sigma^2_{KS}(x_0) = \sigma^2 - \Lambda^t C_0 = \sigma^2 - C_0^t C^{-1} C_0,$$

where $\sigma^2 = C(0)$.

By way of covariance function, use is made of any appropriate covariance function such as the exponential covariance function, square exponential function, or any other admissible covariance function.

Recourse is not necessarily had to simple kriging. Recourse may as a variant be had to another type of kriging such as ordinary kriging, universal kriging, kriging with external drift.

As regards ordinary kriging, there exist very similar equations. We put:

$$K = \begin{pmatrix} C & U \\ U^t & 0 \end{pmatrix},$$

where $U^t = (1, \ldots, 1)^t$ is a vector of 1 of length n, $$(\Lambda^+)^t = (\Lambda, \mu)^t,$$

the vector $\Lambda$ augmented with $\mu$, the Lagrange parameter;

$$(C_0^+)^t = (C_0, 1)^t$$

the vector $C_0$ augmented with 1.

The kriging system is then:

$$K \Lambda^+ = C_0^+,$$

whose solution is $$\Lambda^+ = K^{-1} C_0^+.$$

Let us also put $(Z^+)^t = (Z, 0)^t$, the vector of samples augmented with a 0. The ordinary kriging of $Z(x_0)$, and the associated kriging variance are:

$$Z^{KO}(x_0) = (\Lambda^+)^t Z^+ = (C_0^+)^t K^{-1} Z^+,$$

$$\text{and } \sigma^2_{KS}(x_0) = \sigma^2 - (C_0^0)^t K^{-1} C_0^0,$$

where $(C_0^0)^t = (C_0, 0)^t$ is the vector $C_0$ augmented with a 0.

Once the value has been estimated for the quantity at the location $X_0$, it is sought to determine an estimation of the value of the quantity at $X_1$. In step 105, a location $x_i$ near to $x_0$ is determined The location $x_1$ is indicated by an downward oriented triangle in FIG. 3. The location $x_1$ is determined as a function of the location $X_0$ in any appropriate way, such as, for example, the location nearest to $X_0$ for which no value has yet been estimated for the quantity.

In step 106, the neighborhood $V(X_1)$ of the locations near to $X_1$ for which a measured value for the quantity is available is determined The neighborhood $V(X_1)$ is represented delimited by a dashed line in FIG. 3.

As may be noted, in FIG. 3, the set of points $S_i$ forming part of the neighborhood $V(X_1)$ and of those forming part of the neighborhood $V(X_0)$ are identical.

As the inverse of the covariance matrix for the neighborhood $V(X_0)$ is already available, there is no need to estimate this matrix again for the neighborhood $V(X_1)$ and, consequently, the estimated value for the quantity $Z_k(X_1)$ is obtained, in step 107, through a very small number of computations.

In step 108, it is determined whether an estimation of the values of the quantity has been obtained for sufficient spacings. If such is not the case, step 106 is returned to while incrementing the index i of the location for which the value of the quantity is estimated in step 109.

In the general case, the neighborhood $V(X_{i-1})$ of a point $X_i$ will end up being different from the neighborhood $V(X_{i-1})$ for the previous location $X_{i-1}$. That is to say the method operates by sliding of the neighborhood. In FIG. 3 the location $X_2$ is represented by a rightward oriented triangle, and the neighborhood $V(X_2)$ by a chain dotted line. As may be seen in FIG. 3, the neighborhood $V(x_2)$ is distinguished from the neighborhood $V(X_1)$ by the addition of locations identified $S_+$ and by the removal of locations identified S.

Rather than estimating, starting from nothing, the inverse of the covariance matrix in the neighborhood $V(x2)$, use is made of the fact that this sub-space differs little from the sub-space $V(x1)$ for which the inverse of the covariance matrix is already known, subsequent to an earlier computation. The value of the quantity estimated at the location x2 is thus estimated on the basis not only of the second sub-space, but of the first sub-space and of the inverse of the covariance matrix (also called the precision matrix) for the first sub-space. This scheme implements in particular the Schur complements.

One therefore seeks to determine the inverse of the covariance matrix of the second sub-space, knowing the inverse of the covariance matrix of the first sub-space.

Generally, it is known that:

$$M^{-1} = \begin{pmatrix} A & B \\ B^t & D \end{pmatrix}^{-1} = \begin{pmatrix} A^{-1} + A^{-1} B S^{-1} B^t A^{-1} & -A^{-1} B S^{-1} \\ -S^{-1} B^t A^{-1} & S^{-1} \end{pmatrix},$$

Where $S=D-B^tA^{-1}B$ is called the Schur complement of M.

The above equation shows that to obtain the inverse of a matrix M for which the inverse of a sub-matrix A is already known, it is not necessary to undertake a new complete inversion, but it suffices to invert the Schur complement (of much smaller dimension) and to undertake a few matrix products. This allows a considerable time saving.

It is assumed for example that the second sub-space is obtained by adding locations to the first sub-space.

Let us consider a set A of locations (A is $V(s_1)$, the neighborhood of $s_1$), for which the covariance matrix $C_{A,A}$, of dimension N×N is known. This matrix has already been inverted, and its inverse, $C^{-1}_{A,A}$, has been stored. A set of locations, B, of smaller dimension, noted n, is added. B consists for example only of the few locations $s_+$. The conventional expedient would have consisted in creating the matrix $$C_{A\underline{U}B,A\underline{U}B} = \begin{pmatrix} C_{A,A} & C_{A,B} \\ C^t_{A,B} & C_{B,B} \end{pmatrix},$$

by adding the necessary rows and columns, and then in inverting the matrix, this being an operation of the order of $(N+n)^3$ operations.

On the contrary, the inverse of the Schur complement $S=C_{B,B}-C^t_{A,B}C^{-1}_{A,A}C_{A,B}$ is computed, which has the dimension n×n, and this yields:

$$C^{-1}_{A\underline{U}B,A\underline{U}B} = \begin{pmatrix} C^{-1}_{A,A}+C^{-1}_{A,A}C_{A,B}S^{-1}C^t_{A,B}C^{-1}_{A,A} & -C^{-1}_{A,A}C_{A,B}S^{-1} \\ -S^{-1}C^t_{A,B}C^{-1}_{A,A} & S^{-1} \end{pmatrix}.$$

The algorithm is fast, already knowing $C_{A,A}^{-1}$:
1. Compute $U=C^{-1}_{A,A}C_{A,B}$
2. Compute $S=C_{B,B}-C^t_{A,B}U$
3. Compute $T=S^{-1}$
4. Compute $R=UT$,
and put $$C^{-1}_{A\underline{U}B,A\underline{U}B} = \begin{pmatrix} C^{-1}_{A,A}+UR^t & -R \\ -R^t & T \end{pmatrix}.$$

The number of operations required to carry out this inversion is of the order of $n^3+2(N^2n+n^2N)$, that is to say that of the order of $N^2$ operations remain. This is a considerable time saving.

It is assumed for example that the second sub-space is obtained by deleting locations from the first sub-space.

We now wish to delete a set B of locations. The locations s, are the locations to be removed. It is assumed here that these sites relate to the last rows and columns of the matrix. We therefore have a matrix:

$$\begin{pmatrix} M & P \\ P^t & Q \end{pmatrix},$$

which is the inverse of a covariance matrix on a set A U B of locations (AUB corresponds to the first sub-space), and we seek the matrix $C^{-1}_{A,A}$.

By matching terms, we find Q=T, P=−R and $U=RT^{-1}=RQ^{-1}$. And therefore finally $$C^{-1}_{A,A}=M-UR^t=M-RQ^{-1}R^t=M-PQ^{-1}P^t.$$

The computations are therefore still simpler in this case.

When the second sub-space is obtained on the basis of the first first-space at one and the same time by adding and by deleting locations, it will be possible for example to implement the above two steps successively.

In step 107, the value of the quantity at $s_2$ is estimated by kriging.

The method is looped until the estimation has been obtained for the set of desired locations (end step 110), for example some thousands of locations.

The method therefore makes it possible to work with large neighborhoods, by updating the precision matrix (inverse of the covariance matrix) according to the above equations. Working with a large neighborhood exhibits several advantages:

it makes it possible to be able to carry out kriging more easily at large distances, since it can take into account remote data in several directions at one and the same time;

it noticeably softens the transitions when changing neighborhood through the combined effect of dilution (since a large part of the neighbors remains identical), and of remoteness since only remote points will exit or will enter the neighborhood (if the neighborhood is large, the nearby points remain in the sliding neighborhood when there is little movement).

According to one embodiment, the precision matrix is maintained so that the sites are arranged in order of their increasing distance from the estimation site. This is done for the following reasons:

the nearest neighbors search algorithm returns the sites in this order, the sites which have disappeared or appeared are always the most distant, the Schur decomposition operates solely on the last rows and columns of the matrix.

The updating of the matrix therefore entails the following steps:

1. Permute the matrix so that the old sites are arranged in order of their increasing distance from the new estimation site.
2. Apply the Schur complements scheme to delete the sites (last rows and columns).
3. Apply the Schur complements scheme to add the sites (last rows and columns).
4. Permute the matrix so that the new sites are arranged in order of their increasing distance from the new estimation site.

Practically, a permutation is decomposed into a product of transpositions. The number of these transpositions remains small as long as the neighborhood evolves little. These transpositions then operate essentially on the last rows and columns.

Figure 5:
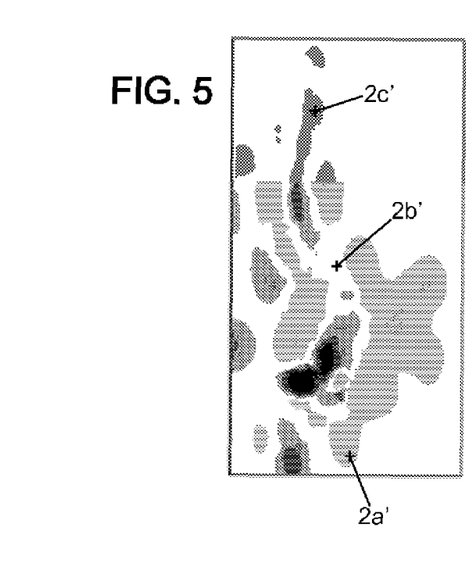
FIG. 5 is a schematic view from above of a set of quantities estimated by an embodiment of the method.

An exemplary representation of the results arising from the method described above is given in FIG. 5. The latter corresponds to the result of the simulation method implemented on the basis of the observation data represented in FIG. 2, and the same color code applies to this figure. The zones 2a', 2b', 2c' are thus recognized, corresponding respectively to the zones 2a, 2b, 2c of FIG. 2. Tests carried out on one and the same computing system make it possible for the result represented in FIG. 5 to be obtained in 10 minutes, whereas about 120 minutes are required to obtain a similar result for a conventional method. The conventional method moreover involves only 16 locations in the neighborhood, whereas, during this trial, the present method has been implemented with 200 locations in the neighborhood. The result obtained is therefore more precise for a comparable computational power.

Figure 4:
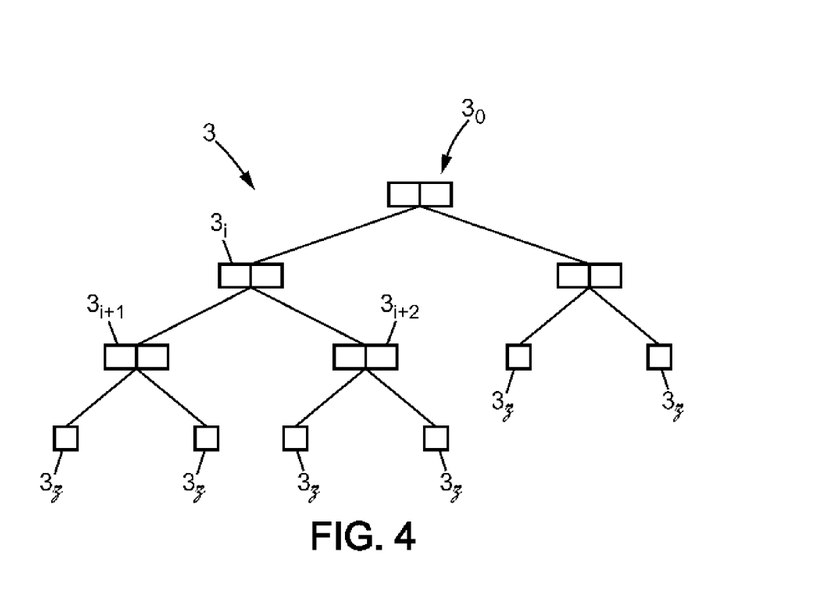
FIG. 4 is a schematic view of a kd-tree.

One of the steps of the invention consists in determining a neighborhood of location of the point considered where the value of the quantity is to be estimated. An exemplary method for the construction of such a neighborhood involves Kd-trees 3 such as represented in FIG. 4.

The tree-like structure used is a binary tree in which each node represents at one and the same time a subset of the given locations and a partitioning of this subset. The root node $3_0$ represents the entirety of the given locations. Each non-terminal node $3_i$ possesses two child nodes $3_{i+1}$, $3_{i+2}$, which represent the two subsets defined by the partitioning.

The terminal nodes $3_z$ represent small mutually disjoint subsets which form a partition of the given locations.

For each non-terminal node, the partitioning consists in determining on the associated locations the component of maximum variability, and then in choosing the median value of this component as separation limit. The maximum number of locations for each non-terminal node is fixed at an arbitrary value nb.

By construction, to each node of the tree there corresponds a domain of patch type encompassing the locations associated with this node, and whose limits are defined by the successive partitionings associated with the parent nodes. The domain corresponding to the root node is the entire space. The volume of the domain decreases according to the increasing level of depth in the tree.

For the space considered, the above tree of locations is therefore constructed in the course of an initial step, after having obtained the observation data.

The search algorithm uses a recursive sweep through the depth of the tree. The recursive procedure considers the root node at the first call. If the node considered is terminal then all the associated locations are examined. A list of the k nearest neighbors encountered together with their dissimilarity at the enquiry location is maintained in the course of the search in the form of a priority queue. When an examined location is found nearer than the furthest location of this list, the list is updated. If the node considered is non-terminal, then the recursive procedure is called on the child node representing the locations situated on the same side of the partition as the enquiry location.

On the return pass, a test is performed to determine whether it is necessary to examine the locations situated on the opposite side of the partition from the enquiry location. The examination is necessary when the domain delimiting these locations intercepts the ball centered at the enquiry location and of radius equal to the dissimilarity of the $k^{th}$ current nearest neighbor. In the affirmative the recursive procedure is called on the child node representing these locations.

At the end of the procedure, a test is performed to determine whether it is necessary to continue the search. Continuation is not necessary when the ball centered at the enquiry location and of radius equal to the dissimilarity of the $k^{th}$ current nearest neighbor is entirely contained in the domain associated with the node considered.

The above search algorithm is for example implemented in step 103 to determine the neighborhood of the location $x_0$.

This method could be implemented to determine the neighborhood of each location.

According to a particular embodiment, it is possible to seek to further improve the precision of the results by improving the distribution of the near neighbors that are used. By decreasing the randomness and the inhomogeneity of the distribution of the points taken into account for the kriging, with respect to the point studied, the risk of errors or artifact is reduced. An envisaged solution is to force the distribution of the nearest neighbors in all directions. In the case of an application to a three-dimensional domain, it is possible to force the distribution of the nearest neighbors as a function of the octants around the point to be kriged.

Taking octants into account consists in constraining the search for the nearest neighbors in accordance with each octant and then merging the searches. It is necessary to make one or more (one per octant) traversals of the tree.

The method therefore proceeds as follows to impose a distribution of the nearest neighbors:

Firstly, the space is divided into S sectors.

A number N of nearer neighbors is preselected, if possible, in each sector. N lies between V/S and the necessary totality of the nearest neighbors V, V=200 for example. The set of preselected nearest neighbors must be at least equal to V. A simple way is to take a number N near to V. This number N will be able to depend upon the distribution of the measurements, the number of sectors, the points to be kriged, etc.

For each sector, a number of neighbors V/S is selected if possible.

For each sector, a check is carried out to verify whether there are sufficient nearest neighbors selected: that is to say V/S. If neighbors are lacking in a sector, then neighbors are added to the selections of the other sectors on the basis of their preselections.

This method makes it possible to perform a sectorially distributed procedure for choosing. The selection is thereafter supplemented if sectors are deficient.

As a variant, hereinafter, several examples are described of methods for determining the neighborhood $V(x_{t+1})$ on the basis of the neighborhood $V(x_t)$.

For example, the distance used in the description hereinbelow is the Euclidian distance, or any other suitable distance.

A moving enquiry location is considered and its position is denoted $x_t$. We define $D_t(i)$ to be the distance of the $i^{th}$ nearest neighbor (among the locations $s_1, \ldots, s_n$) of $x_t$ and $\epsilon_t$ to be the initial search bound guaranteeing to find at least the k nearest neighbors of $x_t$. By definition $D_t(k) \leq \epsilon_t$.

EXAMPLE 1

Method by Fixed Upper Limit

At the instant t, the k nearest neighbors of the enquiry location at the position $x_t$ are $\{p_1, p_2, \ldots, p_k\}$ and $D_t(k)$ is the maximum distance of these locations from $x_t$. At the instant t+1, the enquiry location shifts to the position $x_{t+1}$. Then:

$$\epsilon_{t+1} = D_t(k) + \delta,$$

where $\delta$ is the distance between $x_t$ and $x_{t+i}$.

This exemplary method deduces therefrom:

at the instant t=1, the static search is executed normally (for the location $x_0$). The location $V(x_0)$ is thus determined.

At the instant t>1, the steps consist firstly in initializing the initial search bound $\epsilon_t$ as explained above and then in executing a new static search. The location $V(x_t)$ is thus determined

EXAMPLE 2

Optimized Method

At the instant t, the set P of k nearest neighbors of the enquiry location at the position $x_t$ is $P\{p_1, p_2, \ldots, p_k\}$, $D_t(k)$ is the maximum distance of these locations from $x_t$ and $D_t(k+1)$ is the minimum distance of the locations outside of this set P from $x_t$.

At the instant t+1, the enquiry location shifts to the position $x_{t+1}$. Then the neighborhood obtained is unchanged if $\delta \leq (\frac{1}{2}) (D_t(k+1) - D_t(k))$, where $\delta$ is the distance between $x_t$ and $x_{t+1}$.

Otherwise, the neighborhood obtained still contains the locations $p_i$ satisfying $D_t(i) < D_t(k+1) - 2\delta$ where $\delta$ is the distance between $x_t$ and $x_{t+1}$.

This exemplary method deduces therefrom:

At the instant t=1, the static search is executed normally (for the location $x_0$).

At the instant t>1, the first step consists in verifying whether the neighborhood previously obtained is still correct. In the affirmative, it suffices to return the result ($V(x_t) = V(x_{t-1})$). In the negative, the following steps consist in determining the locations that are still correct in the neighborhood, and then in initializing the initial search bound $\epsilon_t$ (according to the method according to example 1) and finally in executing a new static search.

EXAMPLE 3

Method by Pre-search

At the instant t, the m nearest neighbors of the enquiry location at the position $x_t$ are stored in a buffer, where m>k. $D_t(k)$ and $D_t(m)$ are respectively the $k^{th}$ and $m^{th}$ distances associated with these locations. At the instant t+1, the enquiry location shifts to the position $x_{t+1}$. Then it is not necessary to update the buffer if $$\delta \leq (\frac{1}{2}) (D_t(m) - D_t(k))$$

where $\delta$ is the distance between $x_t$ and $x_{t+1}$.

This exemplary method deduces therefrom:

At the instant t=1, the search is executed for the m nearest neighbors. The result is stored in a buffer and the k nearest neighbors are extracted.

At the instant t>1, the first step consists in verifying whether the neighborhood is contained in the buffer. In the affirmative, it suffices to examine the locations of the buffer. In the negative, the following step consists in executing a new static search for the m nearest neighbors. The result is stored in the buffer and the k nearest neighbors are extracted.

EXAMPLE 4

Method by Dual-buffer

Two buffers of size k are maintained in the course of the enquiries. The first buffer is intended for the candidate locations for the current enquiry position. The second buffer is intended for the candidate locations for the next enquiry position.

At the instant t=1, the search for the k nearest neighbors is executed while computing for each examined location the distance from this location to the next enquiry position. The k current nearest neighbors are kept in the first buffer and the k best results for the next enquiry position are stored in the second buffer.

At the instant t>1, the locations of the second buffer are copied into the first buffer and the maximum distance from these locations to the current enquiry position is used as initial search bound. The locations of the second buffer are preserved but sorted this time in increasing order of their distance from the next enquiry position. Then a new search for the k nearest neighbors is executed and the two buffers are updated.

The initial search bound in this example is thus always lower than that in the method according to the first example.

The method, which is described above for one quantity can be implemented for a suite of quantities comprising one or more quantities to be estimated.

If the above method makes it possible to confirm the presence of hydrocarbons to be extracted from the zone considered, it is possible to construct an oil exploitation rig 4 for the space considered. The grid obtained by the above method can be used to estimate the characteristics of the hydrocarbons field, and, consequently, to estimate the installation characteristics of the oil exploitation rig. This exploitation then makes it possible to extract hydrocarbons.

Figure 7:
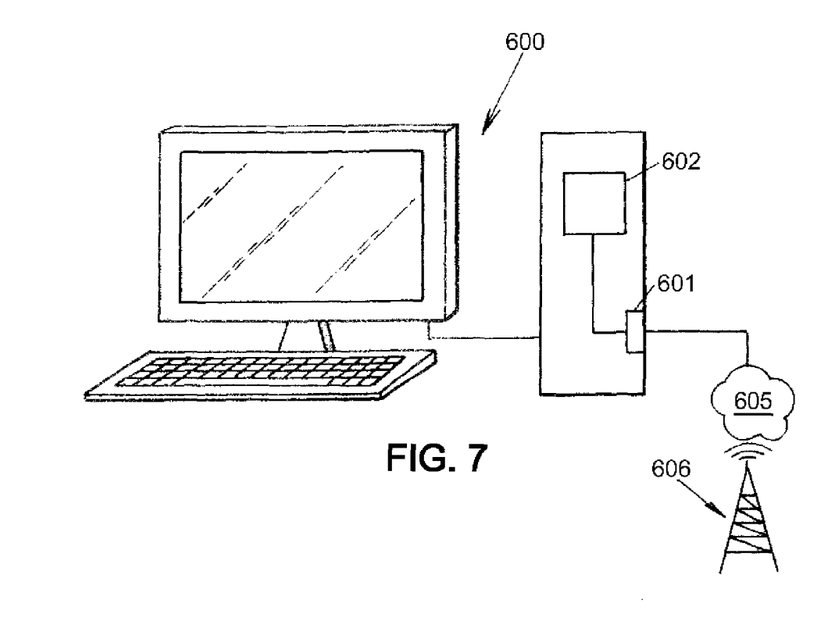
FIG. 7 is a schematic view of a computing system suitable for implementing the method.

FIG. 7 describes an exemplary simulation device 600. In this embodiment, the device comprises a computer 600 comprising reception means 601 designed to receive an observation of a given quantity for the geological region, such as for example a modem 601 linked to a network 605, itself in communication with a device 606 providing observation data. The device 600 furthermore comprises a memory for storing a mesh of the space studied. Processing means, for example a processor 602, are suitable for implementing the above method on the basis of the observation data obtained and of the mesh stored in the memory. The processing means 602 are for example able to execute steps 101 to 110 of FIG. 6.

The embodiments above are intended to be illustrative and not limiting. Additional embodiments may be within the claims. Although the present invention has been described with reference to particular embodiments, workers skilled in the art will recognize that changes may be made in form and detail without departing from the spirit and scope of the invention.

Various modifications to the invention may be apparent to one of skill in the art upon reading this disclosure. For example, persons of ordinary skill in the relevant art will recognize that the various features described for the different embodiments of the invention can be suitably combined, un-combined, and re-combined with other features, alone, or in different combinations, within the spirit of the invention. Likewise, the various features described above should all be regarded as example embodiments, rather than limitations to the scope or spirit of the invention. Therefore, the above is not contemplated to limit the scope of the present invention.

The invention claimed is:

1. A computerized method for estimating a suite of quantities associated with locations of a space, wherein said space is a subsurface envisaged for oil exploitation, wherein said quantities are suitable to model a hydrocarbon reservoir in said space, the method comprises the following steps:

a) a set of observation data comprising quantities associated with certain locations is provided, b) a quantity associated with at least one location of a first sub-space included in said space is estimated by kriging, using a precision matrix of the first sub-space, c) a second sub-space included in said space and neighboring the first sub-space is determined, d) a quantity associated with at least one location of the second sub-space is estimated by kriging on the basis of the first sub-space, of the second sub-space, and of the precision matrix determined for the first sub-space, e) confirming the presence of hydrocarbons to be extracted from the space based on the quantity estimated at d).

2. The method as claimed in claim 1 in which, in step d), a precision matrix of the second sub-space is determined on the basis of the precision matrix of the first sub-space, and of a Schur complement of a covariance matrix of one of the first and second sub-spaces.

3. The method as claimed in claim 2, in which the second sub-space is obtained by adding locations to the first sub-space, and in which, in step d), we solve:

$$C_{AUB,AUB}^{-1} = \begin{pmatrix} C_{A,A}^{-1} + UR^t & -R \\ -R^t & T \end{pmatrix},$$

Where
A denotes the set of locations of the first sub-space,
B denotes the set of added locations,
U denotes the set union operation,
$C_{X,Y}$ denotes the covariance matrix of the sets X and Y,
−1 denotes the matrix inversion operation,
t denotes the matrix transposition operation,
$U=C_{A,A}^{-1}C_{A,B}$,
$S=C_{B,B}-C_{A,B}^t U$, is the Schur complement of $C_{AUB,AUB}$,
$T=S^{-1}$,
$R=UT$.

4. The method as claimed in claim 2, in which the second sub-space is obtained by removing locations from the first sub-space, and in which, in step d), we solve:

$$C_{AUB,AUB}^{-1} = \begin{pmatrix} C_{A,A}^{-1} + UR^t & -R \\ -R^t & T \end{pmatrix},$$

Where
A denotes the set of locations of the second sub-space,
B denotes the set of removed locations,
U denotes the set union operation,
$C_{X,Y}$ denotes the covariance matrix of the sets X and Y,
−1 denotes the matrix inversion operation,
t denotes the matrix transposition operation,
$U=C_{A,A}^{-1}C_{A,B}$,
$S=C_{B,B}-C_{A,B}^t U$, is the Schur complement of $C_{AUB,AUB}$,
$T=S^{-1}$,
$R=UT$.

5. The method as claimed in claim 2, in which the second sub-space is obtained at one and the same time by adding locations to and removing locations from the first sub-space, and wherein the second sub-space is obtained by adding locations to the first sub-space, and in which, in step d), we solve:

$$C_{AUB,AUB}^{-1} = \begin{pmatrix} C_{A,A}^{-1} + UR^t & -R \\ -R^t & T \end{pmatrix},$$

where
A denotes the set of locations of the first sub-space,
B denotes the set of added locations,
U denotes the set union operation,
$C_{X,Y}$ denotes the covariance matrix of the sets X and Y,
−1 denotes the matrix inversion operation,
t denotes the matrix transposition operation,
$U=C_{A,A}^{-1}C_{A,B}$,
$S=C_{B,B}-C_{A,B}^t U$, is the Schur complement of $C_{AUB,AUB}$,
$T=S^{-1}$,
$R=UT$; and
in which the second sub-space is obtained by removing locations from the first sub-space, and in which, in step d), we solve:

$$C_{CU'D,CU'D}^{-1} = \begin{pmatrix} C_{C,C}^{-1} + U'R'' & -R' \\ -R'' & T \end{pmatrix},$$

Where
C denotes the set of locations of the second sub-space,
D denotes the set of removed locations,
U' denotes the set union operation,
$C_{X,Y}$ denotes the covariance matrix of the sets X and Y,
−1 denotes the matrix inversion operation,
t denotes the matrix transposition operation,
$U'=C_{C,C}^{-1}C_{C,D}$,
$S'=C_{D,D}-C_{C,D}^t U'$, is the Schur complement of $C_{CU'D,CU'D}$,
$T'=S'^{-1}$,
$R'=U'T'$.

6. The method as claimed in claim 1 in which, in step b), a suite of quantities associated with a plurality of locations of the first sub-space is estimated by kriging when the first sub-space is sufficiently near to said plurality of locations.

7. The method as claimed in claim 1 in which, in step c), the second sub-space is determined on the basis of the first sub-space.

8. The method as claimed in claim 7 in which, in step c), one and/or the other of the following operations are/is implemented:
addition of locations to the first sub-space, said added locations being near to said location for which step d) is implemented,
removal of locations from the first sub-space, said removed locations being far from said location for which step d) is implemented.

9. The method as claimed in claim 1 in which:
after step a), and before step c), a step z) is implemented in the course of which a tree kD-tree is constructed of the locations for which quantities obtained in step a) are available, and
in step c), the second sub-space is determined on the basis of said tree.

10. The method as claimed in claim 9, in which, in step z), the tree comprises a plurality of levels each defining a partition of the set of locations determined in step a), each node of a level comprising a group of locations, said group being partitioned into at least one node of the directly lower level branched to this node, disregarding the groups associated with terminal nodes.

11. The method as claimed in claim 9, in which, in step b), the first subset is constructed by sweeping the tree in search of the locations nearest to the location for which it is desired to estimate the quantity.

12. The method as claimed in claim 11, in which, in step c), the second subset is constructed by using the first subset and the distance between the locations for which it is desired to determine the quantities in step b) and in step d).

13. The method as claimed in claim 11, where, in step c), to impose a distribution of the nearest neighbors, the search for the nearest neighbors is constrained in accordance with several sectors and then the searches are merged.

14. The method as claimed in claim 9, in which the rows and the columns of the precision matrix are ordered according to the distance of the locations of the second sub-space from the location considered on the basis of said tree.

15. The method as claimed in claim 1, in which steps c) and d) are repeated by taking account of a previous sub-space.

16. An oil exploration method, in which the space is a subsurface, in which the quantities are geological quantities of said subsurface, and in which the method as claimed in claim 1 is implemented by using in step a) quantities obtained by seismic imaging.

17. An oil exploitation method in which a method as claimed in claim 16 is implemented, and in which a step y) is implemented in the course of which an oil exploitation rig is constructed for said space.

18. A computer program product suitable for implementing the steps of the methods as claimed in claim 1, when it is implemented on a programmable machine.

* * * * *

UNITED STATES PATENT AND TRADEMARK OFFICE
CERTIFICATE OF CORRECTION

PATENT NO. : 9,891,344 B2  
APPLICATION NO. : 14/004052  
DATED : February 13, 2018  
INVENTOR(S) : Denis Allard et al.

Page 1 of 1

It is certified that error appears in the above-identified patent and that said Letters Patent is hereby corrected as shown below:

In the Claims

Column 14, Line 18 in Claim 5:
Insert a superscript --'-- after the T in the equation.

Signed and Sealed this
Sixth Day of November, 2018

Andrei Iancu
*Director of the United States Patent and Trademark Office*